Patented Aug. 24, 1954

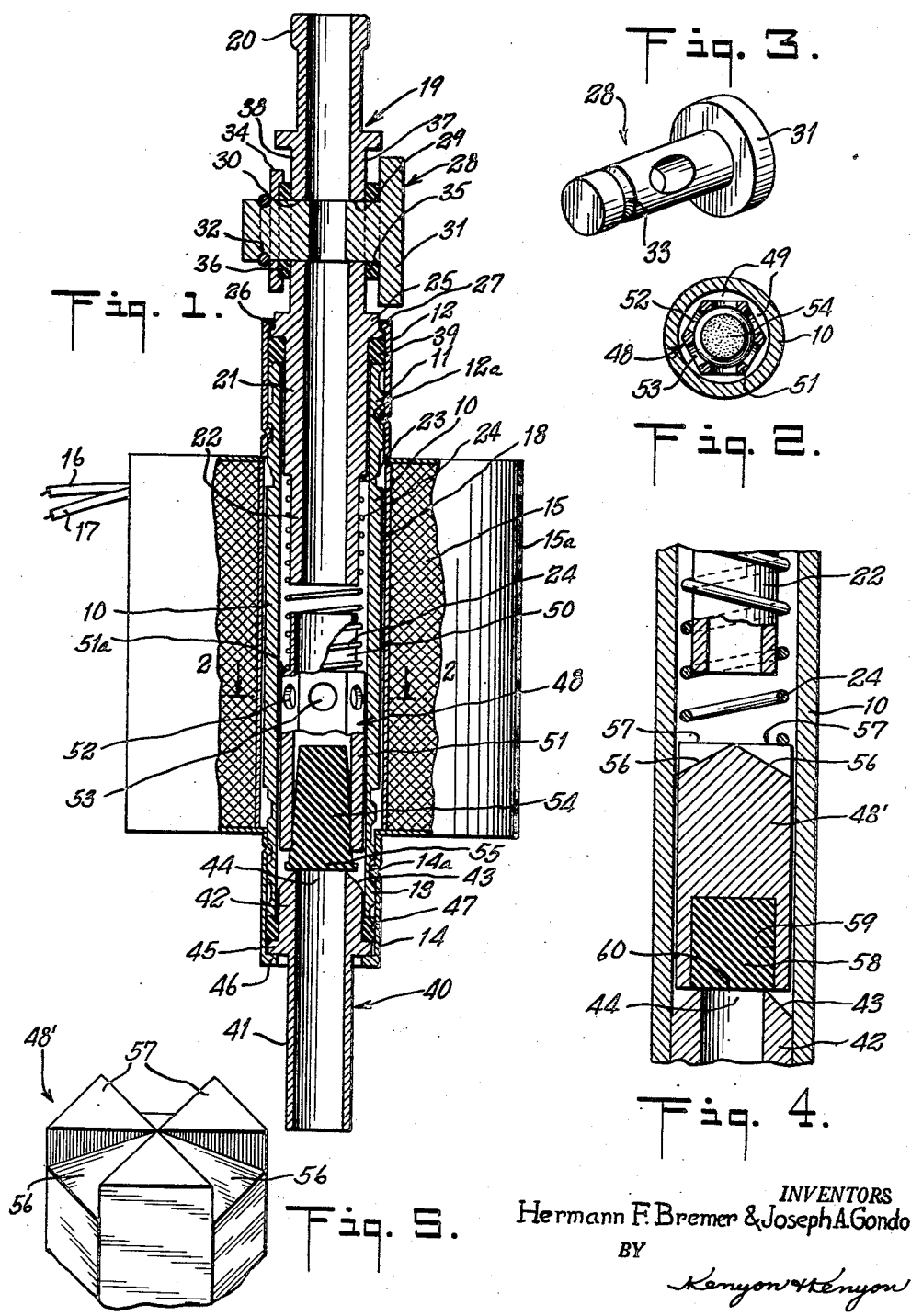

2,687,277

UNITED STATES PATENT OFFICE 2,687,277

SANITARY MAGNETICALLY OPERATED VALVE

Hermann F. Bremer and Joseph A. Gondolfo, Bronx, N. Y., assignors to Rainbows, Inc., Bronx, N. Y., a corporation of New York Application March 13, 1953, Serial No. 342,164

4 Claims. (Cl. 251—139)

This invention relates to a sanitary magnetically actuated valve for controlling the flow of milk, syrups and other fluids intended for human consumption. Such valve may be used in dispensers of various kinds, for example, coin-actuated dispensers.

Among the objects of the invention are to provide a valve structure including both a magnetically controlled shut-off valve and a manually adjustable variable-orifice valve which, without tools, can be completely disassembled and reassembled, exposing all parts where decomposable matter might accumulate, in order to facilitate cleaning and sterilization.

This application is a continuation-in-part of our copending application Serial No. 102,845 filed July 2, 1949, now abandoned.

Reference is made to the attached drawings forming part hereof in which:

Fig. 1 is a longitudinal axial section through the preferred form of valve made in accordance with this invention;

Fig. 2 is a partial section on the line 2—2 of Fig. 1;

Fig. 3 is a perspective view of valve element 28;

Fig. 4 is a partial longitudinal axial section similar to Fig. 1 but limited to the center portion of the valve, showing a magnetic valve member of different shape from that shown in Fig. 1; and Fig. 5 is a perspective view showing the upper end of the magnetic valve member shown in Fig. 4.

The valve of the present invention comprises, among other things, a straight main tube or sleeve body 10, one end portion 11 of which is externally helically screw-threaded for engagement therewith of lug 12a on the inner surface of upper cap 12, and the other end portion 13 of which is externally helically screw-threaded for engagement therewith of lug 14a on the inner surface of lower cap 14. Said lugs may be formed by indentation of the outer surface of the cap. A solenoid coil 15 having conductive leads 16, 17 for energization thereof, is wound upon a central tube or bore 18 adapted to engage externally of or interfit upon main tube 10 and to be freely slidable thereon for convenient removal of the valve structure from within the coil. Coil 15 may be protected by a casing 15a. Coil 15 is of such length that, when caps 12 and 14 are screwed down into seated position, as hereinafter described, the coil is engaged between the respective inner ends thereof and is thus secured against displacement axially of the main tube 10, and tube 10 extends outwardly beyond both ends of casing 15a.

Receiving tube or inlet fitting 19 comprises a nipple 20, to which a liquid feed pipe may be attached, a shank portion 21 adapted to fit slidably and fairly snugly within tube 10, and a reduced shank portion 22 providing a shoulder 23 serving as an abutment for a spring 24, described below. A central opening extends from end to end of tube 19. Tube 19 also has a circumferential projecting flange 25 shaped to form a shoulder 26 which is adapted to be engaged by annular lip 27 of upper cap 12. This flange is of about the same diameter as the external diameter of main tube 10. Tube 19 is also preferably provided with a variable-orifice valve 28 passing through two alined holes 29, 30 in opposite walls of receiving tube 19 and held by an adjusting head 31 and cotter pin 32 engaging groove 33 and washer 34. A pair of rubber washers 35, 36 prevent escape of fluid around the shank of valve member 28. The walls of tube 19 have parallel flat surfaces at 37 and 38 for engagement of washers 35 and 36.

The shank portion 21 of receiving tube 19 is of such external diameter as to be adapted to be thrust within one end of main tube 10, with its reduced shank portion penetrating to or adjacent to the center region of main tube 10 adapted to be surrounded by coil 15, for example as shown in Fig. 1. Receiving tube 19 is adapted to be secured in this position by engagement of its projecting flange 25, and more particularly shoulder 26 thereof, with the annular lip 27 forming part of the upper cap 12. Thus, when cap 12 is screwed down, receiving tube 19 is forced downwardly into main tube 10. A circular rubber washer 39, snugly fitting around shank 21 and within cap 12, serves as a stop for this motion when it is engaged and compressed between projecting flange 25 and the extreme end portion 11 of main tube 10. Washer 39 also prevents leakage of fluid from within the valve.

Delivery tube or outlet fitting 40 is provided with nipple 41, to which a liquid delivery pipe may be attached, and shank portion 42, the latter being of such outside diameter as to be slidably and fairly snugly engageable within lower end portion 13 of main tube 10. Shank portion 42 is provided, at its open upper end, with a conical valve seat 43, whose externally sloping sides surround an opening 44 which is part of the internal bore extending from end to end of tube 40. Tube 40 also includes a projecting circumferential flange 45 of about the same external diameter as that of tube 10 and adapted to be engaged by annular lip 46 of lower cap 14. Thus, when lower cap 14 is screwed up, delivery tube 40 is moved longitudinally into the interior of tube 10. A circular rubber washer 47, snugly fitting within cap 14 and around shank portion 42, affords a stop for such movement. When cap 14 is tightened up, flange 45 of delivery tube 40 compresses rubber washer 47 against the extreme lower end of portion 13 of main tube 10, thus preventing leakage of fluid from inside the valve at this point.

Within tube 10, and intermediate the lower end of shank portion 22 of receiving tube 19, and valve seat 43 of delivery tube 40, is positioned a magnetically responsive valve member 48, freely slidable within main tube 10 and guided thereby in its movement axially of tube 10, which is movable between limits of motion determined at the upper end by contact of member 48 with the lower end of shank portion 22, and at the lower end by contact of rubber plug 55 (to be described) with valve seat 43.

Valve member 48 is made of magnetic material and is so shaped, with reference to the interior wall of tube 10, as to permit the passage of fluid longitudinally of tube 10 between the interior walls of tube 10 and the lateral surfaces of valve 48, in all positions of valve 48. According to the preferred form of this invention valve member 48 is formed of stock whose lateral configuration is that of a hexagon having straight sides (see Figs. 2 and 5), which, with the curving walls of tube 10, form a plurality of fluid passageways 49 (Fig. 2).

According to the preferred form of this invention (see Figs. 1 and 2) valve member 48 comprises two tubular portions—an upper tubular portion 50 whose outer surface is cylindrical and whose outer diameter approximates the outer diameter of reduced shank portion 22 of receiving tube 19, and a lower tubular portion 51 formed of tubular stock whose external configuration is hexagonal as seen in a plane normal to the axis, and whose diameter through the apices of the hexagon is slightly less than the internal diameter of tube 10, thus permitting valve member 48 to be freely slidable lengthwise within tube 10. Where portions 50 and 51 join an annular shoulder 51a is formed. Member 48 is provided with a series of holes 52, 53 permitting flow of fluid from the interior drilling to the exterior segmental spaces 49. A removable rubber plug 54, shaped somewhat like a cork, is frictionally engaged within the open lower end of the drilling in portion 51, preferably in such position that its projecting larger end 55 is adapted to engage across opening 44 with the edges of valve seat 43. This engagement becomes the effective shut-off valve mechanism of the device, when valve member 48 is moved downwardly within tube 10.

The motion of valve 48 is controlled in part by spring 24 compressed between shoulder 23 and shoulder 51a, and by the forces exerted upon valve member 48 by magnetic flux when coil 15 is energized, tending to raise valve member 48 against the compression of spring 24.

Caps 12 and 14 may be regarded as consisting, respectively of a head portion and a dependent annular skirt. The head portion is perforated to afford clearance for the inlet and outlet fittings 19 and 40, respectively, the edges of these perforations constituting shoulder 26 and lip 46 to which reference has been made above. The two caps, whose skirts have means to engage the screw-threads at each end of tube 10, constitute the primary means by which all the principal parts are held together, and by which the entire structure may be readily disassembled for cleaning. When the two caps are tightened down, each fitting is forced against one end of the main tube 10 with washer 39, 47 compressed between them, thus assuring a structure which is liquid-tight from end to end. The caps also have the function, performed through the lower extremities of their skirts, of locating and securing the coil 15 in proper position mid-way along tube 10. Removal of caps 12 and 14 releases all of these parts, which may then be cleaned and sterilized if desired.

According to a modification of the invention the movable valve member may consist of a solid block of magnetic material, having a hexagonal configuration and suitably bored or cut at each of its ends as shown in Figs. 4 and 5 and described below.

In this form of the invention (see Figs. 4 and 5) the valve member 48' is cut away at one or more places at its upper end to provide inclined channels 56 and intervening flat portions 57 where the top of the member has been left undisturbed. The arrangement at the upper end is such that spring 24 bears against surfaces 57, but when valve member 48' is in its uppermost position so that surfaces 57 come in contact with the lower end of shank portion 22, there is ample space for fluid issuing downwardly from the bore of shank portion 22 to pass through inclined channels 56 to the segmental spaces 49 at the sides of member 48'. In this form of the invention a rubber plug 58 is seated within a drilling 59 at the lower end of member 48', and the lower end portion 60 of this plug is adapted to engage with valve seat 43 and thus to close opening 44 against the flow of fluid through the valve. This closing is effected by spring 24 when coil 15 is not energized; the valve is opened when energization of coil 15 raises valve member 48' against the resistance of spring 24.

The invention is not limited to the particular form of device or devices here shown but comprehends structures equivalent thereto.

We claim:

1. A sanitary magnetically operated valve comprising a solenoid coil, a casing therefor having a centrally disposed bore therein, a sleeve body interfitting with said bore and extending outwardly beyond both ends of said casing and having a helical groove in each exposed end thereof, inlet and outlet fittings carried within the upper and lower ends respectively of said sleeve body and each provided with a longitudinal central opening extending from end to end of each fitting, one end of the outlet fitting constituting a valve seat, a shoulder on each fitting lying adjacent an end of said sleeve body, a compressible sealing gasket interposed between each said shoulder and an end of said body, a removable cap at each end of the valve for retaining each of said fittings in mounted position within said sleeve body, each said cap having an opening receiving an end of one of said fittings, an indentation on each cap frictionally engaging within one of said grooves in the sleeve body, a multi-sided valve element of magnetic material having inclined channels at its upper end and movable within said sleeve body and having the sides thereof spaced from said body to form a plurality of passageways for transmitting liquid from the opening in the inlet fitting to that in the outlet fitting, said channels intersecting said passage ways, a block of compressible material embedded within said valve element and a spring interposed between said inlet fitting and said valve element normally urging said valve element to a position engaging said valve seat whereby said block of material will effectively close and seal the passageway in said outlet fitting.

2. A sanitary magnetically operable valve comprising, in combination, a main tube adapted to be enclosed at its mid-portion by a solenoid coil freely slidable thereon, with the ends of the tube projecting beyond the coil and having external screw-threads thereon; an inlet fitting having at one end a receiving nipple and at the other end a tube portion adapted to extend into the upper end of the main tube and terminating in a delivery orifice therein, said inlet fitting having between its nipple and tube portion a projecting circumferential flange whose outer diameter is approximately equal to the external diameter of the main tube; an outlet fitting having at one end a delivery nipple and at the other end a tube portion adapted to extend into the lower end of the main tube and terminating in a valve-seat orifice therein, said outlet fitting having between its nipple and tube portion a projecting circumferential flange whose outer diameter is approximately equal to the external diameter of the main tube; a valve member of magnetic material movable axially of the main tube in the mid-portion thereof between said delivery orifice and said valve-seat orifice in response to changes in magnetic flux produced by said coil and thus to open and close said valve-seat orifice; an annular washer interposed between each end of the main tube and one of said circumferential flanges; and a pair of caps one at each end of the main tube, each cap consisting of a perforated head portion and a dependent annular skirt, said skirts having means to engage the screw-threads at each end of said tube, the head portion of one of said caps being adapted to compress the flange of the inlet fitting and one end of the main tube upon the washer between them, and the head portion of the other cap being adapted to compress the flange of the outlet fitting and the other end of the main tube upon the washer between them, the skirts of both said caps serving to confine and locate the coil at about the mid-point of the main tube.

3. A valve as described in claim 2 wherein there is a continuous tube axially throughout the length of the magnetic valve member and a cork-like rubber plug of generally frusto-conical shape is frictionally and removably inserted within one end of this tube and is adapted to serve as the closure for said valve-seat orifice.

4. A valve as described in claim 2 wherein the magnetic valve member has inclined channels at one end and at the other a rubber insert adapted to serve as the closure for said valve-seat orifice.

References Cited in the file of this patent

UNITED STATES PATENTS

| Number | Name | Date |
|---|---|---|
| 1,538,092 | Cohen | May 19, 1925 |
| 2,267,515 | Wilcox | Dec. 23, 1941 |
| 2,279,243 | Parsons | Apr. 7, 1942 |
| 2,297,076 | Sacks | Sept. 29, 1942 |
| 2,328,382 | Langson | Aug. 31, 1943 |
| 2,561,922 | Hall | July 24, 1951 |
| 2,634,757 | Haughton | Apr. 14, 1953 |

FOREIGN PATENTS

| Number | Country | Date |
|---|---|---|
| 574,387 | France | 1924 |